Patented Jan. 19, 1926.

1,570,353

UNITED STATES PATENT OFFICE.

RUDOLF JACOBSSON, OF KAGEROD, SWEDEN.

METHOD OF PRODUCING ALUMINA.

No Drawing.     Application filed August 25, 1924. Serial No. 734,119.

*To all whom it may concern:*

Be it known that I, RUDOLF JACOBSSON, a citizen of the Kingdom of Sweden, residing at Kagerod, Sweden, have invented new and useful Improved Methods of Producing Alumina, of which the following is a specification.

This invention relates to an improved method of producing pure alumina from raw materials which besides alumina contain oxides of silicon, titanium, iron and calcium, in the first line white clays but also other minerals containing a large percentage of alumina, such as bauxite and Labrador stone.

It has already been proposed to treat such aluminium compounds with acids, as for instance sulphuric acid, for removing the silica and the titanic oxide and for converting the alumina and other metal oxides contained in the raw material to corresponding salts, and then to separate the dissolved salts from the undissolved residue and finally to convert the aluminium salt into alumina by heating while separating it from the other salts contained in the solution or their oxides. As far as known no such method has been practically used on a technical scale, depending on the difficulties of different kinds meeting the industrial application of such processes, as for instance too great losses of the chemical agents used, the difficulty of obtaining sufficiently resistant apparatus, the difficulty of producing alumina of sufficient pureness, and so on.

The chief object of the present invention is to provide a process of producing alumina from minerals containing aluminium oxide by using sulphuric acid as dissolving agent, which process is simple and cheap and which as result gives alumina of such pureness that it is well suited for the manufacture of metallic aluminium.

The invention consists, chiefly, in a new method of converting the aluminium sulphate obtained in dissolving the raw material in sulphuric acid into a highly porous aluminium oxide from which the iron is removed as iron chloride in gaseous state as will be more fully described in the following description.

The process is, preferably, carried out in the following manner.

The raw material, for instance clay, is first calcined for removing its content of water and its colloidal state and is then finely ground if it is not already pulverulent. The raw material is then treated with hot sulphuric acid under pressure in an autoclave whereby the silicon, titanium and calcium are separated in insoluble state as $SiO_2$, $TiO_2$ and $CaSO_4$ while sulphates of Al, K, Mg and Fe are dissolved. The concentration of the sulphuric acid is, preferably, so chosen that a hydrous aluminium sulphate containing about 10 to 18 $H_2O$ is directly obtained. As long as the solution of sulphates is hot it remains fluid and at such temperature it is separated from the undissolved residue by centrifugation or filtration and washing with hot water. If a more weak sulphuric acid is used, the solution separated from the residue is evaporated so much that the remaining water is bound as water of crystallization when the solution is cooled.

The concentrated hot solution of sulphates thus produced is then left to cool and it thereby solidifies to a hard solid mass, the content of water being wholly bound as water of crystallization. Said mass is granulated to grains of suitable size having for instance a diameter from 1 to 10 millimeters, or the hot solution is spread as drops in a cold atmosphere and brought to solidification by cooling when falling through said atmosphere. The solid granulated mass is then heated in vacuum until the water of crystallization has been fully removed, without fusing the sulphate. In this removal of the water the single grains maintain their form and the result will be a highly porous mixture of anhydrous sulphates.

These porous sulphates are then decomposed by heating up to a temperature of 700 to 800° C. whereby alumina impured by iron oxide is obtained as porous grains while a gas mixture of $SO_2$, $SO_3$ and $O_2$ is driven off, said gases being collected and in well-known manner again converted into sulphuric acid which is used in the prosecution of the process for treating further quantities of the raw material. The sulphuric acid thus circulates in the process and only small losses of acid need be covered by addition of fresh sulphuric acid.

The alumina obtained in the glowing process through highly porous possesses a great mechanical strength so that no essential losses by dusting occur. On account of its porous structure it is easily penetrated by gases which is an essential advantage in the following operation which has for its object the removal of the iron.

For removing the iron in the product the iron oxide is, preferably, first reduced to metallic iron which can be performed either by means of reducing gases, as for instance hydrogen, carbon monoxide or gaseous hydrocarbons, or by means of a metal which has a greater affinity to oxygen than iron and the oxide of which is not injurious to the quality of the alumina. The only metal which practically can be used for said purpose is aluminium. In said reduction the aluminium oxide maintains its porous structure inasmuch as the reduction takes place at a temperature far below the melting point of the aluminium oxide. The iron is then distilled off by means of chlorine at a temperature above 300° C., the iron escaping as iron chloride in gaseous state. For the complete removal of the iron the chlorine used should be absolutely free from oxygen as the iron at the temperature used has a greater affinity to oxygen than to chlorine. In the technical execution of the process it is, however, very difficult completely to exclude air and steam and I prefer, therefore, to avoid the drawback of atmospheric oxygen and steam which eventually accompanies the chlorine by a small quantity of metallic aluminium which is caused to react with the hot chlorine gas so that gaseous aluminium chloride is formed which is mixed with the chlorine gas, or I add a small quantity of anhydrous aluminium chloride in gaseous state to the chlorine. The aluminium oxide accompanying the chlorine gas reacts immediately with iron oxide which may have been formed and converts it into iron chloride which vaporizes while aluminium oxide is formed. As this reaction runs quantitatively it is sufficient to use a quantity of aluminium or aluminium chloride which is equivalent to the oxygen, or a small excess thereof only.

The iron chloride driven off is collected and combusted with air or pure oxygen, which combustion results in iron oxide and free chlorine. Also this reaction runs quantitively so that such small excess of oxygen which can be practically obtained is sufficient. The chlorine set free can be again used so that only small losses of chlorine need be covered by a supply of fresh chlorine in continuously carrying out the process.

For the chlorine I can also use gaseous hydrochloric acid which is free from steam and oxygen with a small addition of aluminium chloride for removing the iron. For the addition of aluminium chloride to the chlorine gas or the gaseous hydrochloric acid I can perform the reaction with said agents in the presence of carbon or of a chloride of another substance than aluminium which has a greater affinity to oxygen than to chlorine, as for instance carbon tetrachloride, chromium chloride or tin chloride.

If the percentage of iron in the impure alumina is small it is not necessary first to reduce the iron oxide and then to remove the iron by means of chlorine but the effect aimed at can be reached by working with aluminium chloride only in gaseous state which in such case reacts with iron oxide so that aluminium oxide and iron chloride are formed which latter is vaporized. The process becomes in this manner simplified but the consumption of aluminium chloride and accordingly of metallic aluminium for producing the chloride will be greater.

The technical advantages of the process above described in comparison with other similar processes hitherto proposed depend partly thereon that the removal of the iron is the last operation so that all preceding operations can be carried out in iron apparatus without the quality of the final product being injured by iron from the apparatus, and partly by transforming the product before the removal of the iron into a highly porous state which allows a rapid diffusion inwardly through the whole mass of the gaseous agents used for the removal of the iron and also a corresponding rapid diffusion outwardly of the gaseous iron chloride formed whereby the purification process can be performed at such short time as is requested for the practical use of the process on a large scale.

The product purified from iron is practically free from such impurities which would reduce its value as raw material for the production of metallic aluminium.

What I claim is:—

1. Method of producing alumina, comprising vaporizing the water of crystallization from hydrous aluminium sulphate without fusing the salt, and then heating the anhydrous sulphate to such temperature that the sulphuric acid is driven off, the remaining product being alumina of high porosity.

2. Method of producing porous alumina, comprising producing a hydrous aluminium sulphate by dissolving a raw material containing alumina in hot sulphuric acid, separating the solution of sulphates from the undissolved residue and leaving it to solidify by cooling, vaporizing the water of crystallization from the solid sulphates without fusing them, and then heating the anhydrous sulphates to such temperature that the sulphuric acid is driven off.

3. Method of producing alumina free from iron which comprises heating hydrous aluminium sulphate impured by iron sulphate in vacuum until the water of crystallization has been driven off without fusing the sulphates, heating the anhydrous sulphates to such temperature that the sulphuric acid is driven off and metal oxides of high porosity remain, and subjecting the latter to chemical agents adapted to convert the iron into iron chloride which is vaporized.

4. Method of producing alumina free from iron which comprises treating a raw material containing alumina with hot sulphuric acid, recovering solid hydrous sulphates from the solution obtained, vaporizing the water of crystallization from said sulphates without fusing them, heating the anhydrous sulphates to such temperature that the sulphuric acid is driven off and metal oxides of high porosity remain, subjecting said porous oxides to the action of a reducing agent, and finally subjecting the product to chemical agents adapted to convert the iron into iron chloride which is vaporized.

5. Method of producing alumina free from iron, which comprises treating a raw material containing alumina with hot sulphuric acid, recovering solid hydrous sulphates from the solution obtained, vaporizing the water of crystallization from said sulphates without fusing them, heating the anhydrous sulphates to such temperature that the sulphuric acid is driven off and metal oxides of high porosity remain, subjecting said porous oxides to the action of a reducing agent, and finally subjecting the product to chlorine and aluminium chloride at such temperature that the iron is converted into iron chloride which is vaporized.

In testimony whereof I have signed my name.

RUDOLF JACOBSSON.